US012789712B2

United States Patent

(12) United States Patent
Kim et al.

(10) Patent No.: US 12,789,712 B2
(45) Date of Patent: Nov. 10, 2026

(54) ADJUSTABLE STORAGE DEVICES AND METHODS FOR VEHICLES

(71) Applicant: GM GLOBAL TECHNOLOGY OPERATIONS LLC, Detroit, MI (US)

(72) Inventors: Boeui Kim, Seoul (KR); Sungho Oh, Seo-gu (KR); Eunsuk Yang, Incheon (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 301 days.

(21) Appl. No.: 18/646,936

(22) Filed: Apr. 26, 2024

(65) Prior Publication Data

US 2025/0333003 A1 Oct. 30, 2025

(51) Int. Cl.
*B60R 7/04* (2006.01)
*B60R 13/02* (2006.01)

(52) U.S. Cl.
CPC .......... *B60R 7/046* (2013.01); *B60R 13/0243* (2013.01)

(58) Field of Classification Search
CPC ...................................................... B60R 7/046
See application file for complete search history.

(56) References Cited

U.S. PATENT DOCUMENTS 10,471,900 B1 * 11/2019 Dominguez Cuevas .................... B60N 3/108
2013/0126696 A1 * 5/2013 Decorme ................ B60R 22/00 248/499
2014/0138978 A1 * 5/2014 Langenbacher ......... B60N 2/78 296/37.13
2015/0203048 A1 * 7/2015 Plocher ............... B60R 13/0243 296/146.7

FOREIGN PATENT DOCUMENTS

DE 102008006700 A1 8/2008
DE 202020100020 U1 3/2020

* cited by examiner

*Primary Examiner* — Nicholas McFall
(74) *Attorney, Agent, or Firm* — Ingrassia Fisher & Lorenz, LLP | IFL

(57) ABSTRACT

Methods and adjustable storage devices are provided for vehicles. The devices include rails configured to be fixed within a storage compartment a door of a vehicle. A strap is disposed between the rails, a first clip secures a first end of the strap to the rails, and a second clip secures a second end of the strap to the rails. The position of the first clip along the rails is adjustable to transition the strap between a stowed configuration and a deployed configuration. The strap is planar while in the stowed configuration and defines a loop extending from the rails while in the deployed configuration. The strap is configured to support an object while in the deployed configuration that is disposed within the loop and resting on a base wall of the storage compartment.

20 Claims, 5 Drawing Sheets

ADJUSTABLE STORAGE DEVICES AND METHODS FOR VEHICLES

INTRODUCTION

The technical field generally relates to vehicle storage compartments, and more particularly relates to adjustable storage devices that are deployable to segment the space within the storage compartment and thereby accommodate storage of objects of various shapes and sizes.

Modern vehicles include various storage features throughout the cabin. For example, vehicle doors typically include a storage compartment extending along a lower portion of an interior side thereof. Such storage compartments may be formed in the molded door trim panel. These storage compartments may have various sizes and shapes depending on the vehicle and design. Commonly, one or more walls are formed within the storage compartment that are intended to segment the storage compartment, and thereby promote ease of storing smaller objects. In many examples, such walls define a cup holder configured to support a bottle or cup. While convenient and often desired by end users, these walls segment the storage compartment and therefore reduce the maximum possible size of objects that may be stored therein. For example, providing a cup holder within the storage compartment may reduce the remaining space within the storage compartment to an extent such that an umbrella may not fit therein that would otherwise fit without the cup holder.

Accordingly, it is desirable to provide storage features for vehicles that promote storage of objects having various shapes and sizes. In addition, it may be desirable to provide storage features that are adjustable to accommodate objects of various shapes and sizes. Furthermore, other desirable features and characteristics of the present disclosure will become apparent from the subsequent detailed description and the appended claims, taken in conjunction with the accompanying drawings and the foregoing introduction.

SUMMARY

A method is provided for segmenting a storage compartment. In one example, the method includes fixing a pair of guide rails within a storage compartment of a door trim panel of a door of a vehicle, wherein the storage compartment is defined by at least an outer wall, an inner wall, a front wall, a rear wall, and a base wall, disposing a flexible strap between the pair of guide rails, fixing a first clip adjacent to a first end of the flexible strap, fixing a second clip adjacent to a second end of the flexible strap, securing the flexible strap to the pair of guide rails with at least the first clip and the second clip, configuring at least the first clip to be selectively movable along the pair of guide rails to transition the flexible strap between a stowed configuration and at least one deployed configuration, wherein the flexible strap is planar between the pair of guide rails while in the stowed configuration, wherein the flexible strap defines a loop extending from the pair of guide rails while in the at least one deployed configuration, and configuring the flexible strap to support an object while in the deployed configuration that is disposed within the loop and resting on the base wall.

In various examples, the method may include securing a third clip to the pair of guide rails such that the third clip overlays the flexible strap between the first end and the second end of the flexible strap, and configuring the third clip to be selectively movable along the pair of guide rails to adjust a dimension between the third clip and one of the first clip and the second clip.

In various examples, the method may include configuring the second clip to be selectively movable along the pair of guide rails.

In various examples, the method may include configuring the first clip to be secured in more than one position along the pair of guide rails to adjust a dimension between a surface within the storage compartment and a distal extent of the flexible strap extending from the pair of guide rails.

In various examples, the method may include providing a plurality of recesses on surfaces of the flexible strap that are configured to promote the flexibility of the flexible strap when transitioning between the stowed configuration and the deployed configuration.

In various examples, the method may include providing interlocking features on the first clip and the pair of guide rails that are configured to functionally interact to releasably maintain the position of the first clip along the pair of guide rails.

In various examples, the method may include arranging the flexible strap between the pair of guide rails such that the flexible strap is aligned with the base wall of the storage compartment.

An adjustable storage device is provided that, in one example, includes a pair of guide rails configured to be fixed within a storage compartment of a door trim panel of a door of a vehicle, wherein the storage compartment is defined by at least an outer wall, an inner wall, a front wall, a rear wall, and a base wall, a flexible strap disposed between the pair of guide rails, a first clip secured to the pair of guide rails at ends of the first clip and secured to a first end of the flexible strap between the ends of the first clip, and a second clip secured to the pair of guide rails at ends of the second clip and secured to a second end of the flexible strap between the ends of the second clip. A position of at least the first clip along the pair of guide rails are adjustable to transition the flexible strap between a stowed configuration and one or more deployed configurations. The flexible strap is planar between the pair of guide rails while in the stowed configuration, and the flexible strap defines a loop extending from the pair of guide rails while in the deployed configuration. The flexible strap is configured to support an object while in the deployed configuration that is disposed within the loop and resting on the base wall.

In various examples, the adjustable storage device includes a third clip secured to the pair of guide rails at ends of the third clip and overlaying the flexible strap between the first end and the second end of the flexible strap, wherein positions of the third clip along the pair of guide rails are adjustable to modify a dimension between the third clip and one of the first clip and the second clip.

In various examples, a position of the second clip of the adjustable storage device is adjustable along the pair of guide rails.

In various examples, the first clip of the adjustable storage device is configured to be secured in more than one position along the pair of guide rails to modify a dimension between a surface within the storage compartment and a distal extent of the flexible strap extending from the pair of guide rails.

In various examples, the flexible strap of the adjustable storage device includes a plurality of recesses on surfaces thereof that are configured to promote the flexibility of the flexible strap when transitioning between the stowed configuration and the deployed configuration.

In various examples, the adjustable storage device includes interlocking features between the first clip and the pair of guide rails that are configured to functionally interact to releasably maintain the position of the first clip along the pair of guide rails.

In various examples, the flexible strap of the adjustable storage device is configured to be secured by the pair of guide rails within the storage compartment such that the flexible strap is aligned with the base wall of the storage compartment.

In various examples, the first clip of the adjustable storage device includes transition portions connecting the ends thereof with a middle portion thereof, wherein the transition portions extend outward from the pair of guide rails to the middle portion, wherein the middle portion overlays the flexible strap.

A vehicle is provided that, in one example, includes one or more doors each having a door trim panel that includes a storage compartment defined by an outer wall, an inner wall, a front wall, a rear wall, and a base wall, and an adjustable storage device secured within the storage compartment of the door trim panel. The adjustable storage device may include a pair of guide rails configured to be fixed within the storage compartment, a flexible strap disposed between the pair of guide rails, a first clip secured to the pair of guide rails at ends of the first clip and secured to a first end of the flexible strap between the ends of the first clip, and a second clip secured to the pair of guide rails at ends of the second clip and secured to a second end of the flexible strap between the ends of the second clip. A position of at least the first clip along the pair of guide rails are adjustable to transition the flexible strap between a stowed configuration and at least one deployed configuration. The flexible strap is planar between the pair of guide rails while in the stowed configuration, and the flexible strap defines a loop extending from the pair of guide rails while in the deployed configuration. The flexible strap is configured to support an object while in the deployed configuration that is disposed within the loop and resting on the base wall.

In various examples, the adjustable storage device of the vehicle includes a third clip secured to the pair of guide rails at ends of the third clip and overlaying the flexible strap between the first end and the second end of the flexible strap, wherein positions of the third clip along the pair of guide rails are adjustable to modify a dimension between the third clip and one of the first clip and the second clip.

In various examples, the first clip of the adjustable storage device of the vehicle is configured to be secured in more than one position along the pair of guide rails to modify a dimension between a surface within the storage compartment and a distal extent of the flexible strap extending from the pair of guide rails.

In various examples, the flexible strap of the adjustable storage device of the vehicle includes a plurality of recesses on surfaces thereof that are configured to promote the flexibility of the flexible strap when transitioning between the stowed configuration and the deployed configuration.

In various examples, the adjustable storage device of the vehicle includes interlocking features between the first clip and the pair of guide rails that are configured to functionally interact to releasably maintain the position of the first clip along the pair of guide rails.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction or the following detailed description.

Figure 1:
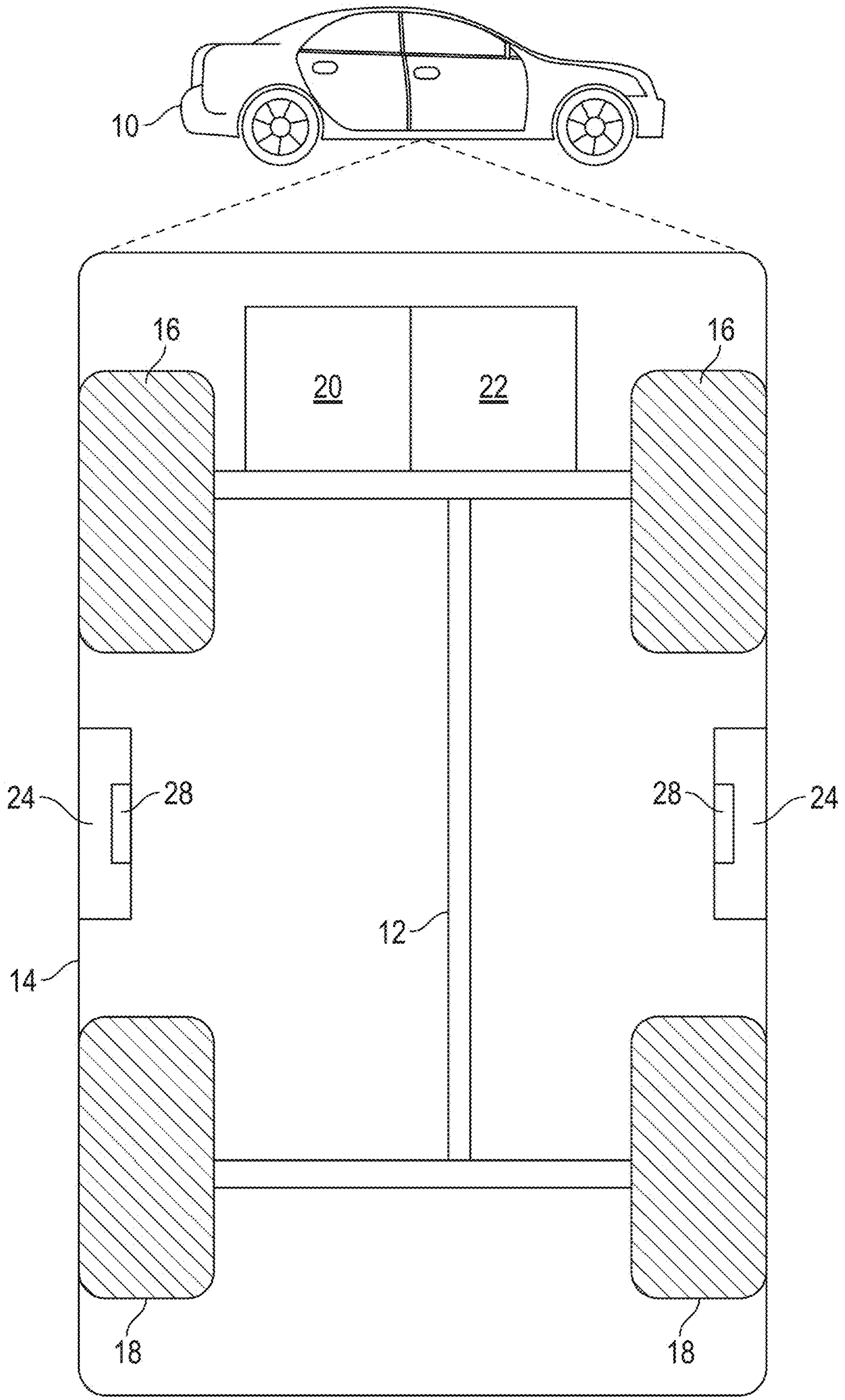
FIG. 1 is a functional block diagram of a vehicle in accordance with an example.

FIG. 1 illustrates a vehicle 10, according to an example. In certain examples, the vehicle 10 comprises an automobile. The vehicle 10 includes one or more doors 24 each having an adjustable storage device 100 for adjusting a storage compartment 28 within the vehicle 10. In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles or mobile platforms in certain examples.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. The vehicle 10 further includes a propulsion system 20, a transmission system 22, and one or more doors 24. The propulsion system 20 includes an engine and/or motor such as an internal combustion engine (e.g., a gasoline or diesel fueled combustion engine), an electric motor (e.g., a 3-phase AC motor), or a hybrid system that includes more than one type of engine and/or motor. The transmission system 22 is configured to transmit power from the propulsion system 20 to the wheels 16-18 according to selectable speed ratios. According to various examples, the transmission system 22 may include a step-ratio automatic transmission, a continuously-variable transmission, or other appropriate transmission.

Figure 2:
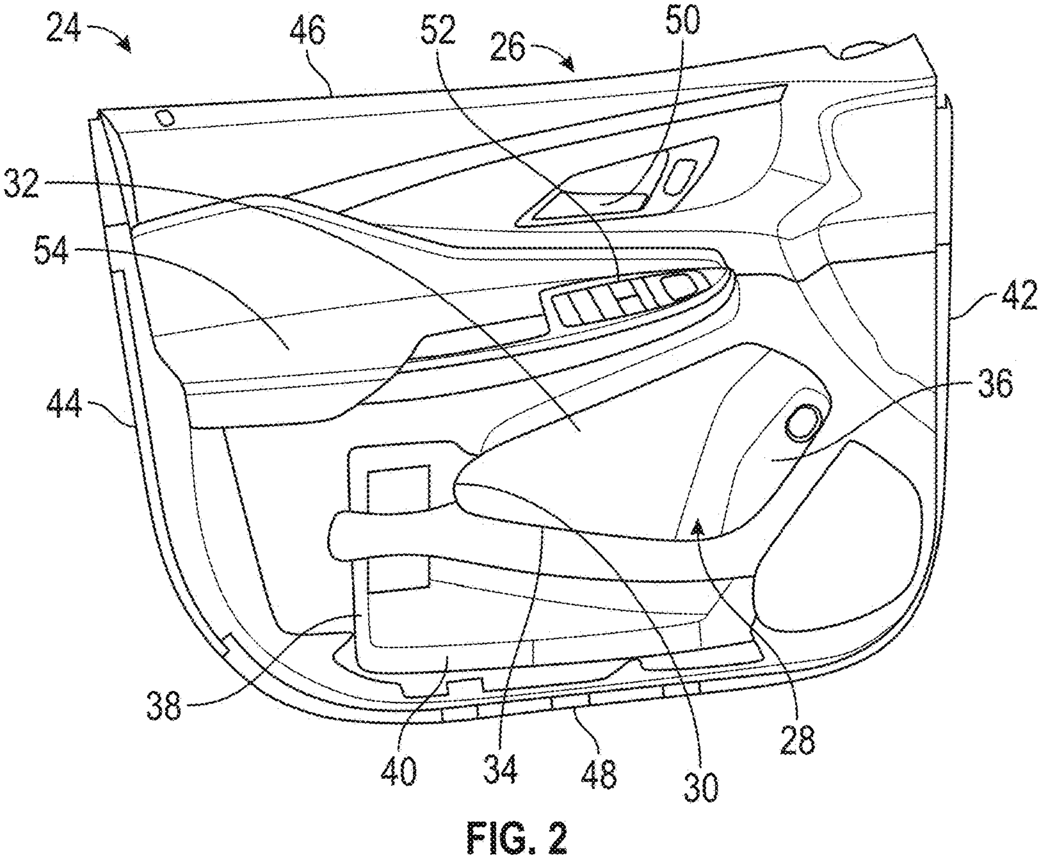
FIG. 2 is a perspective view of a door of the vehicle of FIG. 1 in accordance with an example.

Referring to FIG. 2, and with continued reference to FIG. 1, an example of the door 24 is presented showing an interior view. For convenience, the door 24 will be referred to as including a front 42, a rear 44, a top 46, and a bottom 48. The door 24 may include various components typical of vehicle doors, for example, a handle 50, controls 52, and an armrest 54. The door 24 includes a door trim panel 26 having the storage compartment 28 for item storage. The door trim panel 26 may include various materials. In some examples, the door trim panel 26 may include a molded polymeric material. An opening 30 provides access to the storage compartment 28, which is defined by an outer wall 32, and inner wall 34, a front wall 36, a rear wall 38, and a base wall 40. Notably, the door trim panel 26 and the storage compartment 28 are not limited to the examples of the figures and may include various sizes and shapes.

Figure 3:
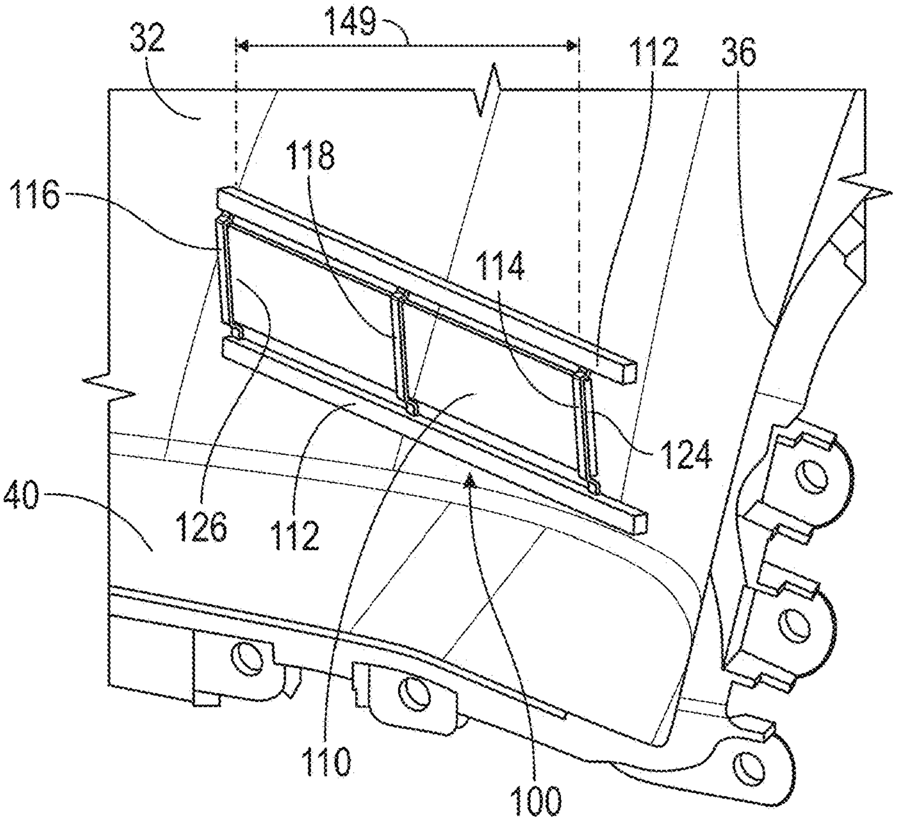
FIG. 3 is a cross-sectional view of a storage compartment of the door of FIG. 2 illustrating an adjustable storage device in accordance with an example.
Figure 4:
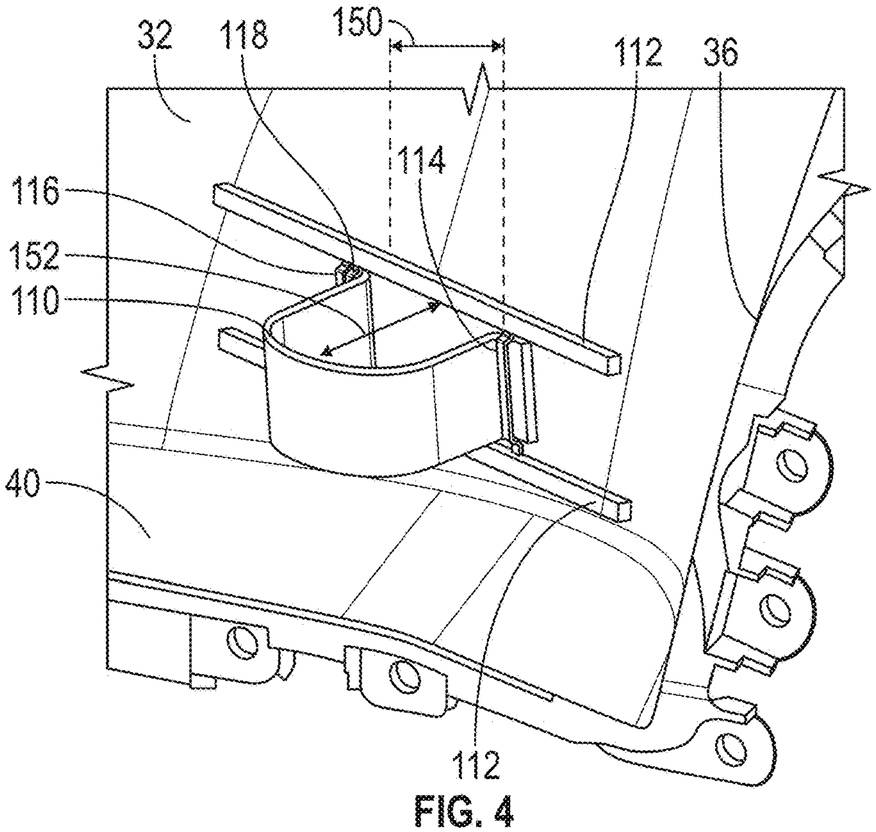
FIG. 4 is a cross-sectional view of the storage compartment of FIGS. 2 and 3 illustrating the adjustable storage device in a deployed configuration in accordance with an example.
Figure 5:
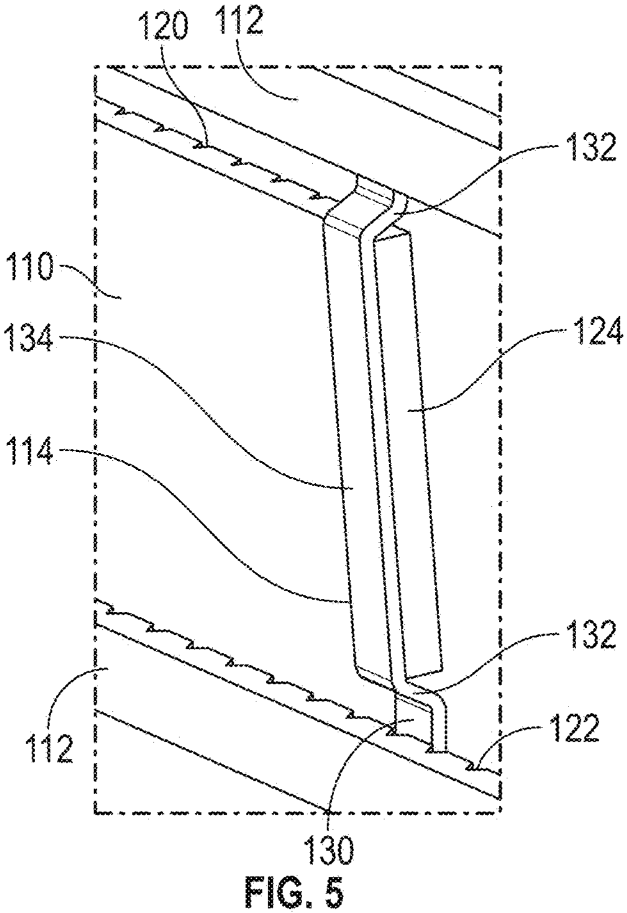
FIG. 5 is an enlarged view of an end of the adjustable storage device of FIGS. 3 and 4 in accordance with an example.

FIGS. 3-5 include views of the storage compartment 28 illustrating various aspects of the adjustable storage device 100. The adjustable storage device 100 may include a pair of guide rails 112 configured to be fixed within the storage compartment 28. The guide rails 112 may be fixed to various surfaces of the door trim panel 26. For example, FIGS. 3-5 represent the guide rails 112 as fixed to the outer wall 32 of the storage compartment 28. However, the adjustable storage device 100 is not limited to this position and may be fixed in other positions and/or orientations.

A flexible strap 110 is provided that is disposed between the pair of guide rails 112. In this example, the flexible strap 110 extends along the pair of guide rails 112 and is aligned therewith. The strap 110 may be secured with two or more brackets or clips. In FIGS. 3-5, the strap 110 is secured to the guide rails 112 with a front clip 114 adjacent a front end 124 of the strap 110, a rear clip 116 adjacent a rear end 126 of the strap 110, and a middle clip 118 disposed between the front clip 114 and the rear clip 116. Each of the front, rear, and middle clips 114, 116, and 118 include distal ends 130 configured to functionally couple with the pair of guide rails 112, transition portions 132 that extend from the distal ends 130 and protrude from a geometric plane defined between the pair of guide rails 112 to provide a space for the strap 110, and an intermediate portion 134 extending between the transition portions 132 that is configured to overlay the strap 110.

In this example, the intermediate portion 134 of the front clip 114 is fixed to the front end 124 of the strap 110, and the intermediate portion 134 of the rear clip 116 is fixed to the rear end 126 of the strap 110. In contrast, the intermediate portion 134 of the middle clip 118 is not fixed to the strap 110 and the middle clip 118 and the strap 110 may move relative to each other.

The distal ends 130 of one or more of the front, rear, and middle clips 114, 116, and 118 may be adjustable to move and/or transition along the pair of guide rails 112. In some examples, the pair of guide rails 112 and the distal ends 130 of the front, rear, and middle clips 114, 116, and 118 each include a plurality of locking features 122 that are functionally coupled to allow the front, rear, and middle clips 114, 116, and 118 to be moved or transitioned between two or more fixed positions along the pair of guide rails 112. With such arrangement, a user may selectively move one or more of the front, rear, and middle clips 114, 116, and 118 along the pail of guide rails 112 and maintain the front, rear, and middle clips 114, 116, and 118 in desired positions along the pair of guide rails 112.

By moving the front, rear, and/or middle clips 114, 116, and 118 along the pair of guide rails 112, the shape of the strap 110 may be adjusted. For example, FIG. 3 shows the strap 110 as fully extended to be flat or planar between the pair of guide rails 112. This arrangement is referred to herein as a stowed configuration, wherein the front clip 114 and the rear clip 116 are disposed at a maximum dimension 149 from each other. The stowed configuration may be desirable when the strap 110 is not in use, such as when a user desires to store a relatively large object in the storage compartment 28 without interference by the strap 110.

One or both of the front clip 114 and the rear clip 116 may be moved along the pair of guide rails 112 to reduce the dimension between the front and rear clips 114 and 116. Since the front and rear ends 124 and 126 are fixed to the front and rear clips 114 and 116, respectively, portions of the strap 110 will be forced outward into the storage compartment 28 as the dimension between the front and rear clips 114 and 116 is reduced. For example, FIG. 4 shows the rear clip 116 as being disposed adjacent to the middle clip 118 causing the strap 110 to bend into a loop shape having a reduced dimension 150 between the front and rear clips 114 and 116, and an extended dimension 152 between a distal portion of the strap 110 and a surface of the storage compartment 28 to which the pair of guide rails 112 are fixed (e.g., the outer wall 32). In some examples, movement of one or both of the front and rear clips 114 and 116 may adjust the extended dimension 152 and movement of the middle clip 118 may adjust the reduced dimension 150. One or more of the front, rear, and/or middle clips 114, 116, and 118 may be moved to adjust the shape and size of the looped portion of the strap 110 extending into the storage compartment 28. Such arrangements are referred to herein as deployed configurations, and the strap 110 may be adjustable between a plurality of deployed configurations.

In various examples, the strap 110 may have features configured to promote the flexibility of the strap 110 when transitioning between the stowed configuration and the deployed configurations. For example, the strap 110 may include a plurality of elongated channels or recesses 120 extending in directions between the pair of guide rails 112. Such recesses 120 may reduce compression of the strap 110 on inner radial portions of the loop defined thereby in the deployed configurations and thereby reduce resistance to the strap 110 bending and potentially reduce a likelihood of the strap 110 twisting.

In some examples, the strap 110 may be sufficiently flexible to form the looped shapes in the deployed configurations, but sufficiently rigid to support an object in contact therewith. For example, the strap 110 may be arranged in a deployed configuration and an object, such as a bottle, may be located within the loop, that is, between the strap 110 and the outer wall 32. With such an arrangement, the object may rest on the base wall 40, and be maintained in a fixed position by the strap 110 and the outer wall 32. As another example, the strap 110 may be arranged in a deployed configuration and an object, such as a bottle, may be located adjacent to the strap 110, such as between the strap 110, the outer wall 32, the front wall 36, and the inner wall 34. With such an arrangement, the object may rest on the base wall 40, and be maintained in a fixed position by the strap 110, the outer wall 32, the front wall 36, and the inner wall 34.

In some examples, the pair of guide rails 112 may be configured to be fixed within the storage compartment 28 in an arrangement such that the strap 110 is aligned with the base wall 40 of the storage compartment 28. Such arrangement may promote uniform support of objects resting on the base wall 40 with the strap 110 when in the deployed configuration(s).

The components of the adjustable storage device 100 may include or be formed of various materials, such as certain polymeric, metallic, ceramic, and/or composite materials. In some examples, the guide rails 112 and the front, rear, and middle clips 114, 116, and 118 may be formed of relatively rigid polymeric materials, and the strap 110 may be formed of a relatively flexible polymeric material.

Figure 6:
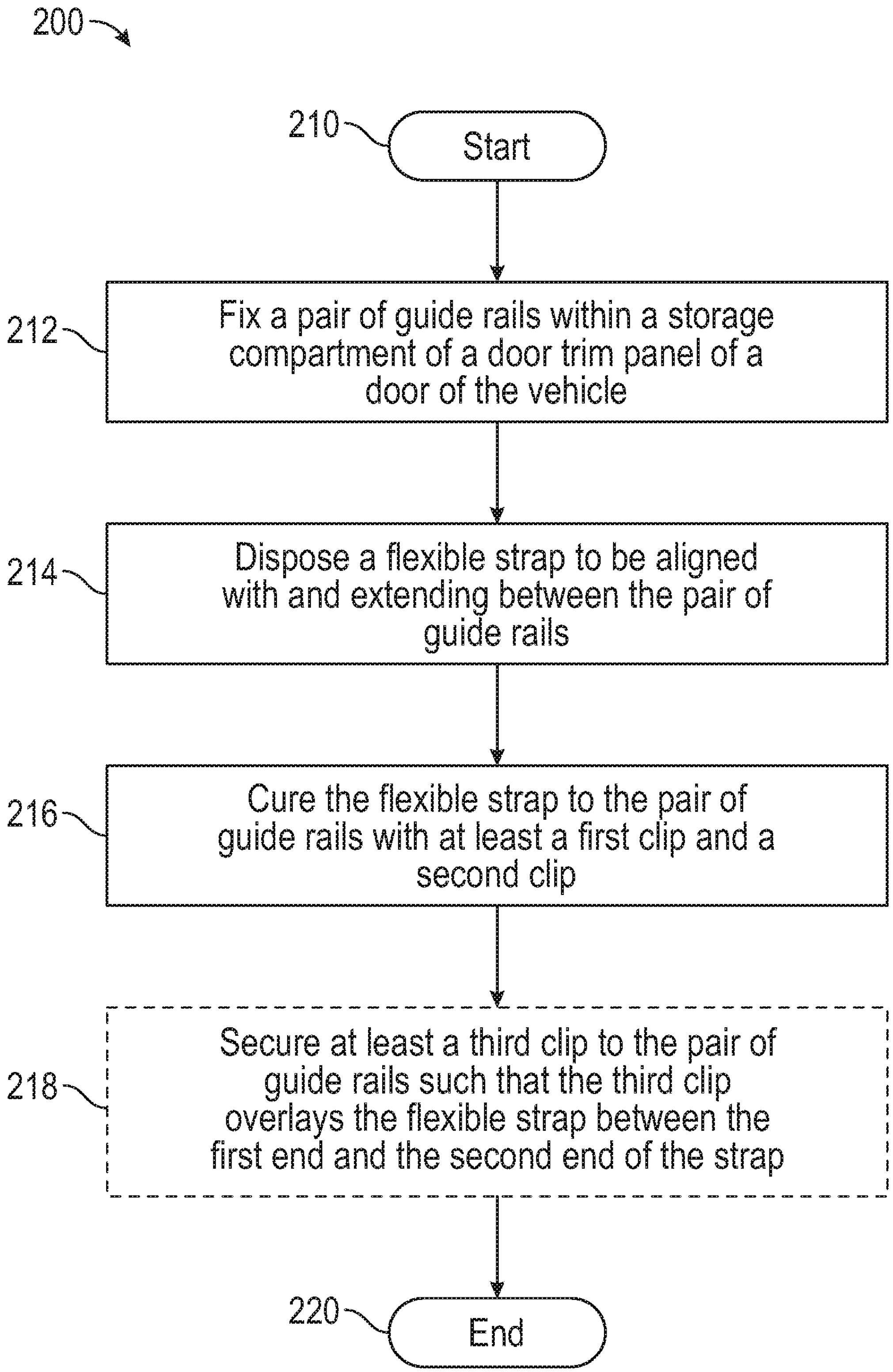
FIG. 6 is a flowchart illustrating a method for installation of an adjustable storage device in accordance with an example.

With reference now to FIG. 6 and with continued reference to FIGS. 1-5, a flowchart provides a method 200 for installing an adjustable storage device (e.g., the adjustable storage device 100) in a vehicle (e.g., the vehicle 10), in accordance with various examples. As can be appreciated in light of the disclosure, the order of operation within the method 200 is not limited to the sequential execution as illustrated in FIG. 6, but may be performed in one or more varying orders as applicable and in accordance with the present disclosure.

In one example, the method 200 may start at 210.

At 212, the method 200 may include fixing a pair of guide rails within a storage compartment of a door trim panel of a door of the vehicle. The storage compartment may be defined by an outer wall, an inner wall, a front wall, a rear wall, and a base wall.

At 214, the method 200 may include disposing a flexible strap to be aligned with and extending between the pair of guide rails.

At 216, the method 200 may include securing the flexible strap to the pair of guide rails with at least a first clip and a second clip. In some examples, the first clip is secured to a first end of the flexible strap between distal ends of the first clip, and the second clip is secured to a second end of the flexible strap between distal ends of the second strap. The ends of one or both of the first clip and the second clip may be secured to the pair of guide rails such that positions of the first clip and/or the second clip along the guide rails are adjustable to transition the flexible strap between a stowed configuration and one or more deployed configurations. In some examples, the flexible strap is planar between the pair of guide rails while in the stowed configuration, and the flexible strap defines a loop extending from between the pair of guide rails while in the one or more deployed configurations. The flexible strap is configured to support an object while in the deployed configuration that is disposed within the loop and resting on the base wall of the storage compartment.

At 218, the method 200 may optionally include securing at least a third clip to the pair of guide rails such that the third clip overlays the flexible strap between the first end and the second end of the strap. In some examples, the position of the third clip along the guide rails may be adjustable to modify a dimension between the third clip and one of the first clip and the second clip.

The method 200 may end at 222.

Figure 7:
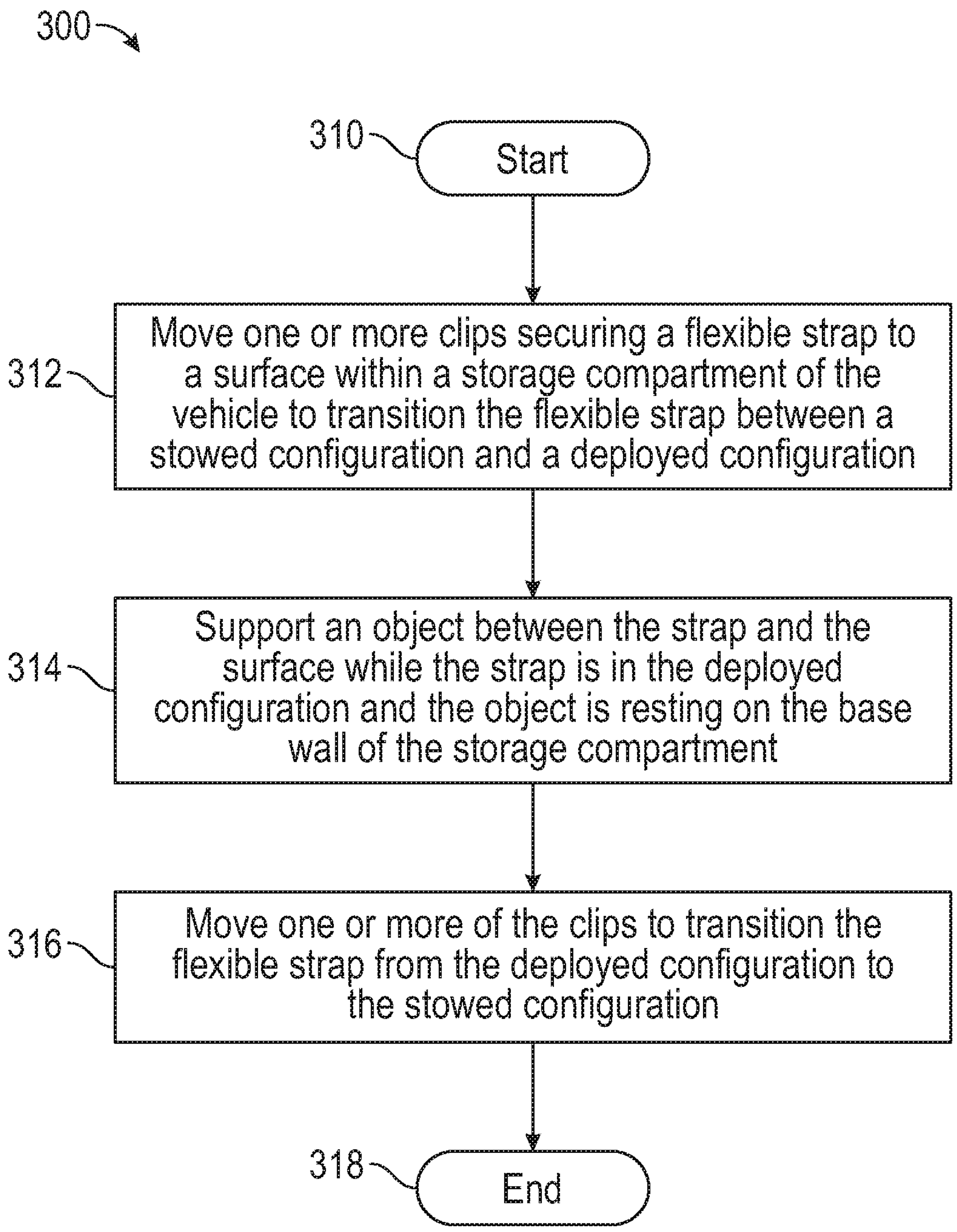
FIG. 7 is a flowchart illustrating a method for storing an object using an adjustable storage device in accordance with an example.

With reference now to FIG. 7 and with continued reference to FIGS. 1-5, a flowchart provides a method 300 for using an adjustable storage device (e.g., the adjustable storage device 100) in a vehicle (e.g., the vehicle 10), in accordance with various examples. As can be appreciated in light of the disclosure, the order of operation within the method 300 is not limited to the sequential execution as illustrated in FIG. 7, but may be performed in one or more varying orders as applicable and in accordance with the present disclosure.

In one example, the method 300 may start at 310.

At 312, the method 300 may include moving one or more clips securing a flexible strap to a surface within a storage compartment of the vehicle to transition the flexible strap from a stowed configuration to a deployed configuration. In some examples, the flexible strap is relatively flat against the surface within the storage compartment while in the stowed configuration, and the flexible strap defines a loop extending from the surface of the storage compartment while in the deployed configuration.

At 314, the method 300 may include supporting an object between the strap and the surface while the strap is in the deployed configuration and the object is resting on the base wall of the storage compartment.

At 316, the method 300 may include moving one or more of the clips to transition the flexible strap from the deployed configuration to the stowed configuration.

The method 300 may end at 318.

The adjustable storage devices and methods disclosed herein provide various benefits over certain existing systems and methods. For example, the adjustable storage devices disclosed herein may be used to selectively adjust segmentation of a storage compartment to accommodate objects of various shapes and sizes.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:

fixing a pair of guide rails within a storage compartment of a door trim panel of a door of a vehicle, wherein the storage compartment is defined by at least an outer wall, an inner wall, a front wall, a rear wall, and a base wall;

disposing a flexible strap between the pair of guide rails;

fixing a first clip to the flexible strap adjacent to a first end of the flexible strap;

fixing a second clip to the flexible strap adjacent to a second end of the flexible strap;

securing the flexible strap to the pair of guide rails with at least the first clip and the second clip;

securing a third clip to the pair of guide rails such that the third clip overlays the flexible strap between the first clip at the first end and the second clip at the second end of the flexible strap, wherein the third clip is not fixed to the flexible strap;

configuring at least the first clip to be selectively movable along the pair of guide rails to transition the flexible strap between a stowed configuration and at least one deployed configuration, wherein the first clip and the second clip are disposed at a maximum dimension from each other and the flexible strap is planar between the pair of guide rails while in the stowed configuration, wherein the flexible strap defines a loop extending from the pair of guide rails while in the at least one deployed configuration;

configuring the third clip to be selectively movable along the pair of guide rails to adjust a dimension between the third clip and one of the first clip and the second clip; and configuring the flexible strap to support an object while in the at least one deployed configuration that is disposed within the loop and resting on the base wall.

2. The method of claim 1, further comprising configuring the second clip to be selectively movable along the pair of guide rails, wherein the first clip, the second clip, and the third clip are independently moveable along the pair of guide rails.

3. The method of claim 1, further comprising configuring the first clip to be secured in more than one position along the pair of guide rails to adjust a dimension between a surface within the storage compartment and a distal extent of the flexible strap extending from the pair of guide rails.

4. The method of claim 1, further comprising providing a plurality of recesses on surfaces of the flexible strap that are configured to promote the flexibility of the flexible strap when transitioning between the stowed configuration and the at least one deployed configuration.

5. The method of claim 1, further comprising arranging the flexible strap between the pair of guide rails such that the flexible strap is aligned with the base wall of the storage compartment.

6. The method of claim 1, further comprising:

configuring the first clip, the second clip, and the third clip to be selectively movable along the pair of guide rails to transition the flexible strap between the stowed configuration and a plurality of the at least one deployed configuration, wherein the loop is defined between a pair of clips including either the first clip and the third clip or the second clip and the third clip, wherein the loop includes a first dimension between the pair of clips and a second dimension between a distal portion of the strap disposed outward of a surface of the storage compartment to which the pair of guide rails are fixed and the surface of the storage compartment;

configurating the first clip and the second clip such that movement of one or both of the first clip and the second clip adjusts the second dimension; and configuring the third clips such that movement of the third clip adjusts the first dimension.

7. The method of claim 1, wherein each of the first clip, the second clip, and the third clip include transition portions connecting the ends thereof with a middle portion thereof, wherein the transition portions extend outward from the pair of guide rails to the middle portion, wherein the middle portion overlays the flexible strap, wherein fixing the first clip and the second clip to the flexible strap includes fixing the middle portion of each of the first clip and the second clip to the flexible strap.

8. An adjustable storage device, comprising:

a pair of guide rails configured to be fixed within a storage compartment of a door trim panel of a door of a vehicle, wherein the storage compartment is defined by at least an outer wall, an inner wall, a front wall, a rear wall, and a base wall;

a flexible strap disposed between the pair of guide rails;

a first clip secured to the pair of guide rails at ends of the first clip and secured and fixed to a first end of the flexible strap between the ends of the first clip;

a second clip secured to the pair of guide rails at ends of the second clip and secured and fixed to a second end of the flexible strap between the ends of the second clip; and a third clip secured to the pair of guide rails at ends of the third clip and overlaying the flexible strap between the first end and the second end of the flexible strap, wherein positions of the third clip along the pair of guide rails are adjustable to modify a dimension between the third clip and one of the first clip and the second clip wherein the third clip is not fixed to the flexible strap, wherein a position of at least the first clip along the pair of guide rails are adjustable to transition the flexible strap between a stowed configuration and one or more deployed configurations, wherein the first clip and the second clip are disposed at a maximum dimension from each other and the flexible strap is planar between the pair of guide rails while in the stowed configuration, wherein the flexible strap defines a loop extending from the pair of guide rails while in the one or more deployed configurations, wherein the flexible strap is configured to support an object while in the one or more deployed configurations that is disposed within the loop and resting on the base wall.

9. The adjustable storage device of claim 8, wherein a position of the second clip is adjustable along the pair of guide rails, wherein the first clip, the second clip, and the third clip are independently moveable along the pair of guide rails.

10. The adjustable storage device of claim 8, wherein the first clip is configured to be secured in more than one position along the pair of guide rails to modify a dimension between a surface within the storage compartment and a distal extent of the flexible strap extending from the pair of guide rails.

11. The adjustable storage device of claim 8, wherein the flexible strap includes a plurality of recesses on surfaces thereof that are configured to promote the flexibility of the flexible strap when transitioning between the stowed configuration and the one or more deployed configurations.

12. The adjustable storage device of claim 8, wherein the flexible strap is configured to be secured by the pair of guide rails within the storage compartment such that the flexible strap is aligned with the base wall of the storage compartment.

13. The adjustable storage device of claim 8, wherein the first clip includes transition portions connecting the ends thereof with a middle portion thereof, wherein the transition portions extend outward from the pair of guide rails to the middle portion, wherein the middle portion overlays the flexible strap.

14. The adjustable storage device of claim 8, wherein positions of the first clip, the second clip, and the third clip along the pair of guide rails are independently adjustable to transition the flexible strap between the stowed configuration and a plurality of the one or more deployed configurations, wherein the loop is defined between a pair of clips including either the first clip and the third clip or the second clip and the third clip, wherein the loop includes a first dimension between the pair of clips and a second dimension between a distal portion of the strap disposed outward of a surface of the storage compartment to which the pair of guide rails are fixed and the surface of the storage compartment, wherein movement of one or both of the first clip and the second clip adjusts the second dimension and movement of the third clip adjusts the first dimension.

15. The adjustable storage device of claim 8, wherein each of the first clip, the second clip, and the third clip include transition portions connecting the ends thereof with a middle portion thereof, wherein the transition portions extend outward from the pair of guide rails to the middle portion, wherein the middle portion overlays the flexible strap, wherein the middle portion of each of the first clip and the second clip are fixed to the flexible strap.

16. A vehicle, comprising:

one or more doors each having a door trim panel that includes a storage compartment defined by an outer wall, an inner wall, a front wall, a rear wall, and a base wall; and an adjustable storage device secured within the storage compartment of the door trim panel, the adjustable storage device including:

a pair of guide rails configured to be fixed within the storage compartment;

a flexible strap disposed between the pair of guide rails;

a first clip secured to the pair of guide rails at ends of the first clip and fixed to a first end of the flexible strap between the ends of the first clip;

a second clip secured to the pair of guide rails at ends of the second clip and fixed to a second end of the flexible strap between the ends of the second clip; and a third clip secured to the pair of guide rails at ends of the third clip and overlaying the flexible strap between the first end and the second end of the flexible strap, wherein positions of the third clip along the pair of guide rails are adjustable to modify a dimension between the third clip and one of the first clip and the second clip wherein the third clip is not fixed to the flexible strap, wherein a position of at least the first clip along the pair of guide rails are adjustable to transition the flexible strap between a stowed configuration and at least one deployed configuration, wherein the first clip and the second clip are disposed at a maximum dimension from each other and the flexible strap is planar between the pair of guide rails while in the stowed configuration, wherein the flexible strap defines a loop extending from the pair of guide rails while in the at least one deployed configuration, wherein the flexible strap is configured to support an object while in the at least one deployed configuration that is disposed within the loop and resting on the base wall.

17. The vehicle of claim 16, wherein the first clip of the adjustable storage device is configured to be secured in more than one position along the pair of guide rails to modify a dimension between a surface within the storage compartment and a distal extent of the flexible strap extending from the pair of guide rails.

18. The vehicle of claim 16, wherein the flexible strap of the adjustable storage device includes a plurality of recesses on surfaces thereof that are configured to promote the flexibility of the flexible strap when transitioning between the stowed configuration and the at least one deployed configuration.

19. The vehicle of claim 16, wherein positions of the first clip, the second clip, and the third clip along the pair of guide rails are independently adjustable to transition the flexible strap between the stowed configuration and a plurality of the at least one deployed configuration, wherein the loop is defined between a pair of clips including either the first clip and the third clip or the second clip and the third clip, wherein the loop includes a first dimension between the two adjacent clips and a second dimension between a distal portion of the strap disposed outward of a surface of the storage compartment to which the pair of guide rails are fixed and the surface of the storage compartment, wherein movement of one or both of the first clip and the second clip adjusts the second dimension and movement of the third clip adjusts the first dimension.

20. The vehicle of claim 16, wherein each of the first clip, the second clip, and the third clip include transition portions connecting the ends thereof with a middle portion thereof, wherein the transition portions extend outward from the pair of guide rails to the middle portion, wherein the middle portion overlays the flexible strap, wherein the middle portion of each of the first clip and the second clip are fixed to the flexible strap.

* * * * *